United States Patent [19]

Moore et al.

[11] Patent Number: 5,689,608
[45] Date of Patent: Nov. 18, 1997

[54] FIBER OPTIC ASSEMBLY

[75] Inventors: Andrew J. Moore; David L. Ma; Robert L. Bontz; Harry B. Bonham, Jr., all of Plano, Tex.

[73] Assignee: Alcatel Network Systems, Inc., Richardson, Tex.

[21] Appl. No.: 485,735

[22] Filed: Jun. 7, 1995

Related U.S. Application Data

[62] Division of Ser. No. 254,438, Jun. 6, 1994, Pat. No. 5,509,952, which is a continuation of Ser. No. 980,246, Nov. 23, 1992, abandoned.

[51] Int. Cl.$^6$ ............................................. G02B 6/00
[52] U.S. Cl. ........................ 385/139; 385/78; 385/77; 385/138; 165/406
[58] Field of Search .................... 385/139, 78, 77, 385/81, 138; 65/406, 387

[56] References Cited

U.S. PATENT DOCUMENTS 5,155,795  10/1992  Wasserman et al. ............. 385/138

*Primary Examiner*—Phan T. Palmer
*Attorney, Agent, or Firm*—Vinson & Elkins L.L.P.

[57] ABSTRACT

A method of increasing the attachment bond strength between a first and second object comprising respective first and second materials is disclosed. Each of the first and second materials has a respective first coefficient of thermal expansion at an assembly temperature, and a second coefficient of thermal expansion at an operational temperature. The method has various steps (FIG. 4). An attachment surface of the first material is configured to be nonplanar (FIGS. 3a, 36, 37). The second material is brought to a contact point with the attachment surface of the first material (FIGS. 3b, 46). The first and second materials are heated at the contact point to the assembly temperature whereby at least one of the materials is caused to flow in response to the heat. Finally, the first and second materials are brought to the operational temperature, wherein at least one of the first and second materials is placed in a compressive state at the contact point due to the relative change in size of at least one of the first and second materials as compared with the change in size of the other of the first and second materials.

12 Claims, 3 Drawing Sheets

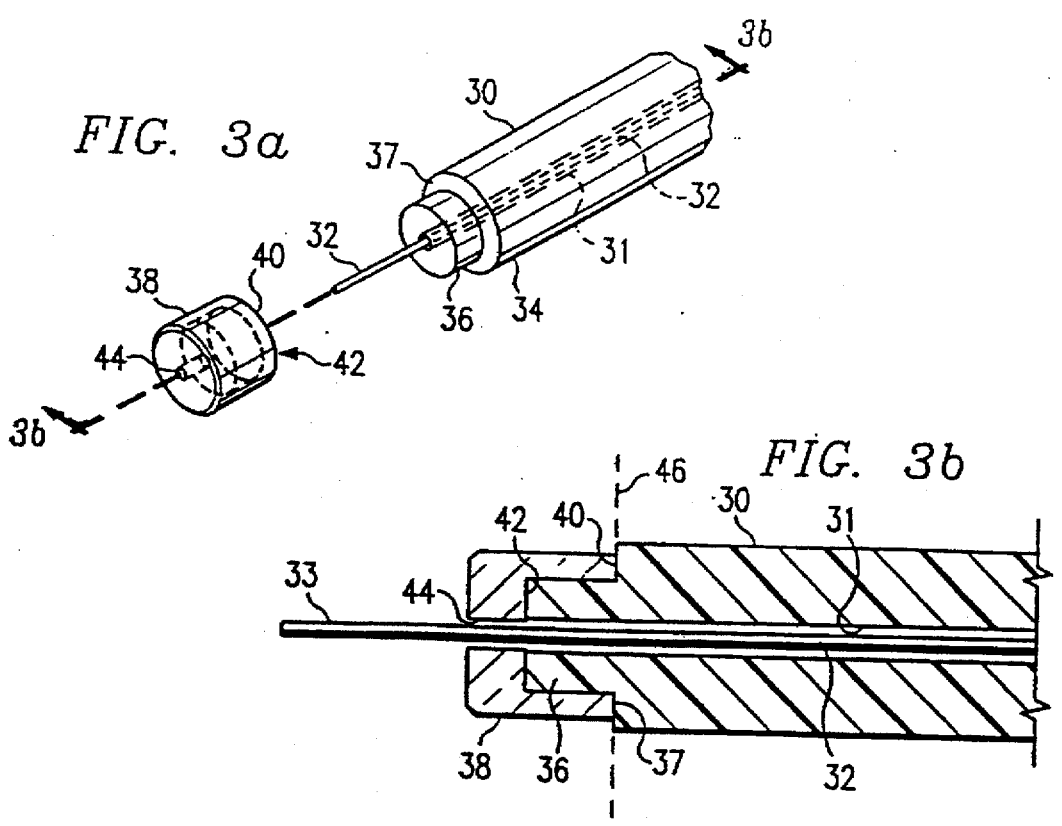
FIG. 3a
FIG. 3b
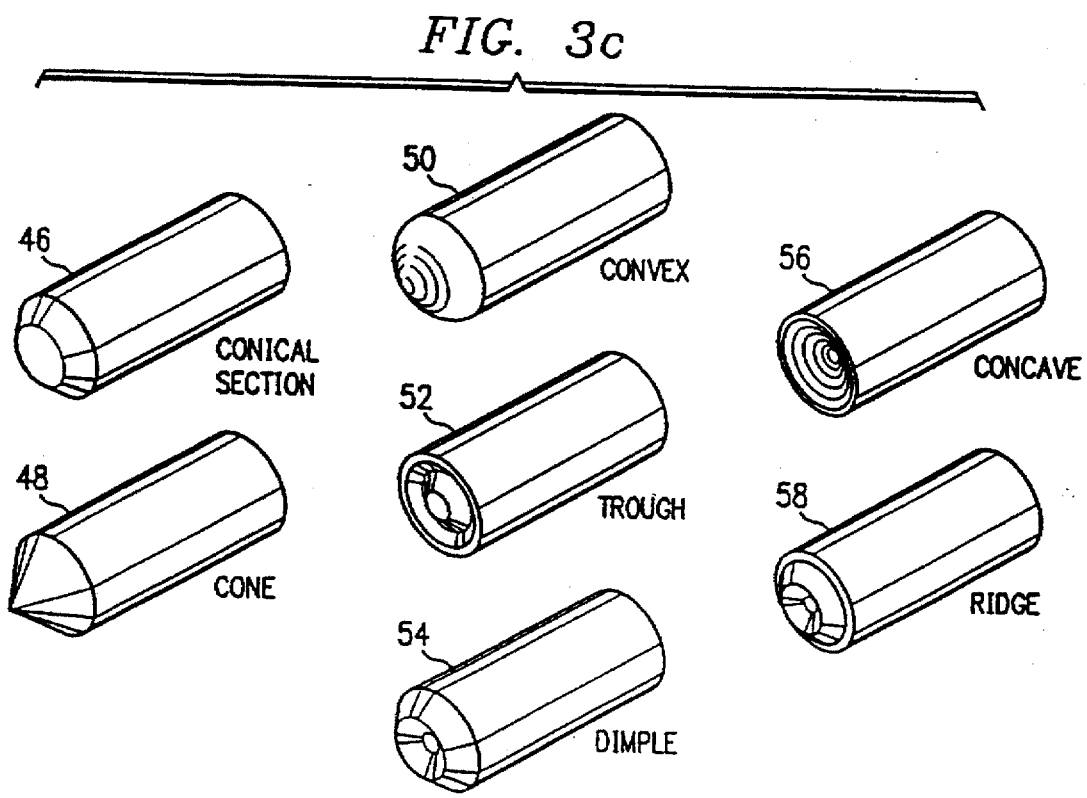
FIG. 3c

FIBER OPTIC ASSEMBLY

RELATED APPLICATIONS

This application is a Divisional of application Ser. No. 08/254,438, filed Jun. 6, 1994, and entitled "Method for Bonding a Fiber to a Sleeve for Fiber Optic Packaging Applications" now U.S. Pat. No. 5,509,952, which is a continuation of application Ser. No. 07/980,246, filed Nov. 23, 1992, entitled "Method for Bonding a Fiber to A Sleeve for Fiber Optic Packaging Applications", now abandoned.

This invention is in the field of component assembly, and is more particularly directed to a method of increasing the attachment bond strength between two different objects made of two different materials.

BACKGROUND OF THE INVENTION

The present invention has broad application to the assembly of component parts wherein it is desired to enhance the bond between the parts. In addition to improved structural integrity, the present invention provides an improved hermetic seal for applications where such a seal is beneficial. Many electrical, electronic, electro-optic, fiber-optic, and photonic (hereinafter, "electro-optic") devices and circuit applications may benefit from these improved attributes and, without limitation, the present invention is described below in connection with electro-optic circuitry implemented in the communications industry.

The communication industry continues to evolve in various different aspects. One major advancement is the implementation of fiber optic technology. As is known in the art, fiber optic communications provide numerous advantages such as increased bandwidth, less noise, lower signal-to-noise ratio requirements, and lower error rates. In addition, the extremely small size of fiber optic cable relative to metallic conductors permits a much larger traffic of communication to occupy the same space previously required by metallic conductors.

As known in the art, communication through an optical fiber is accomplished by placing transmission/detection devices at the tips of both ends of the optical fiber. FIG. 1a illustrates a perspective view of certain components of such a system. Specifically, FIG. 1a illustrates a package 10 which houses the tip of the optic fiber as well as the circuitry used to transmit/receive information along the fiber. Package 10 is commonly a parallelepiped on the order of four centimeters in length and two centimeters in height. A ferrule 12 communicates with a hole or "pass through" in one side of package 10. An optic fiber 14 (illustrated in phantom) having a diameter on the order of 125 microns is aligned in an axial channel of a sleeve 16. Sleeve 16 is cylindrical in shape and has a diameter on the order of 1700 microns. The channel of sleeve 16 is typically on the order of 800 microns in diameter. Sleeve 16 and optic fiber 14 pass through ferrule 12 and into the interior of package 10. In the prior art, solder 18 or some other type of sealing material is typically used to seal the interface between sleeve 16 and the interior of ferrule 12. This seal is intended to prevent contaminants from entering the interior of package 10 between the interface of sleeve 16 and ferrule 12.

FIG. 1b illustrates a cross-sectional view of the interior of package 10 in FIG. 1a. From the perspective of FIG. 1b, note that sleeve 16 extends into the interior area 20 of package 10. Moreover, fiber 14 extends further inwardly into area 20 from a planar end 22 of sleeve 16. While not shown, it is well known in the art that the tip 24 of fiber 14 is precisely placed in a position proximate a sensing device for purposes of transmitting and receiving signals along fiber 14.

FIG. 1b further illustrates a key objective of the present invention. Specifically, as is well known in the art, it is highly desirable if not imperative that interior area 20 of package 10 be maintained hermetically sealed. Such contaminants may interfere with the delicate circuitry and its operation and, hence, may degrade system performance. Thus, various efforts have been made with respect to many aspects of package 10 and its associated componentry in an effort to ensure a minimal amount of contaminants within interior area 20. As readily apparent below, one object of the present invention is to further assure the lack of contaminants within interior area 20.

One aspect of the present invention is directed to the area where fiber 14 exits sleeve end 22. In the known embodiment of FIG. 1b, a sealing element 25 is attached to this area. Sealing element 25 is connected to sleeve end 22, thereby defining a planar interface 26 between the two pieces. Further, fiber 14 passes through sealing element 25 and into interior area 20. Unlike the loose fit between sleeve 16 and ferrule 12, however, the bond between sealing element 25, sleeve 16 and fiber 14 is heated in an effort to seal the sleeve channel which houses fiber 14 from interior area 20. In other words, without such a seal, air or other contaminants trapped within the channel of sleeve 16 could pass into interior area 20 of package 10. As described below, however, this prior art sealing technique is susceptible to failure and, hence, its function may be thwarted. In such an instance, contaminants may pass into interior area 20, thereby reducing or destroying the capability of the transmitting/receiving devices.

FIGS. 2a–c illustrate the method for constructing the seal discussed above in connection with FIG. 1b. Again, therefore, FIG. 2a illustrates a side view of sleeve 16 having an optic fiber 14 passing axially therethrough. From FIG. 2a, the flat shape of planar end 22 of sleeve 16 is better illustrated. Moreover, sealing element 25 is illustrated as a cylinder having a diameter on the order of 1000 microns, a length on the order of 1000 microns and an axial channel 28 (shown by hidden line) formed along the axis of the cylinder. Sealing element 25 in the prior art is constructed of glass.

In the prior art, and as shown in FIG. 2b, tip 24 of optic fiber 14 is threaded through axial channel 28 of sealing element 25. In addition, sealing element 25 is moved in contact with planar end 22 of sleeve 16 as shown in FIG. 2b. Sleeve 16 is then heated. Heat is transferred by conduction to sealing element 25 until it reaches or exceeds the glass softening temperature such that it begins to flow and, therefore, fuses itself to planar end 22 of sleeve 16. The resultant structure causes the bulbous shape depicted as sealing element 25 in FIG. 2c. Moreover, the flow of sealing element 25 causes it to adhere to fiber 14 as well. Thus, in the immediate instance, provided the method is properly performed, a seal is formed along planar interface 26 such that contaminants may not pass from the axial channel of sleeve 16 beyond end 22.

It has become apparent that the prior art technique discussed above suffers from various drawbacks. For example, because end 22 is planar in shape, cracks may develop along planar interface 26, thereby degrading the integrity of the seal. Naturally, if this occurs, contaminants may-enter interior area 20 of package 10. In addition, the planar shape provides only a limited amount of strength in the adhesive bond between sealing element 25 and sleeve 16.

It is therefore an object of the present invention to provide a method for bonding together two different objects made of different materials.

It is a further object of the present invention to provide such a method for increasing the integrity of the hermetic seal between two objects at the time the objects are fused to one another.

It is a further object of the present invention to provide such a method for reducing the degradation of the hermetic seal between two fused objects as the fused objects age.

It is a further object of the present invention to provide such a method for reducing the degradation of the hermetic seal between two objects as the fused objects are subjected to stress, such as storage or operation of the objects under either high or low temperatures.

It is a further object of the present invention to provide such a method for bonding a fiber and sleeve wherein the bond between the two items is less susceptible to cracking.

It is a further object of the present invention to provide such a method which yields a greater compressive force at the interface between the sealing element and fiber sleeve.

It is a further object of the present invention to provide such a method wherein the integrity of the seal between the fiber and sleeve within the package interior is maintained over temperature ranges generated either under actual operating conditions, storage conditions or temperature cycling testing.

It is a further object of the present invention to provide such a method which substantially decreases the possibility of contaminating the interior area of a fiber optic circuit package.

It is a further object of the present invention to provide such a method which substantially enhances the longevity and operability of a fiber optic circuit package.

Still other objects and advantages of the present invention will become apparent to those of ordinary skill in the art having references to the following specification together with its drawings.

SUMMARY OF THE INVENTION

In the preferred embodiment, the present invention includes a method of increasing the attachment bond strength between a first and second object comprising respective first and second materials. Each of the first and second materials has a respective first coefficient of thermal expansion at an assembly temperature, and a second coefficient of thermal expansion at an operational temperature. In the method of the present invention, an attachment surface of the first material is configured to be nonplanar. The second material is brought to a contact point with the attachment surface of the first material. The first and second materials are heated at the contact point to the assembly temperature whereby at least one of the materials is caused to flow in response to the heat. Finally, the first and second materials are brought to the operational temperature, wherein at least one of the first and second materials is placed in a compressive state at the contact point due to the relative change in size of at least one of the first and second materials as compared with the change in size of the other of the first and second materials.

BRIEF DESCRIPTION OF THE DRAWINGS

For a more complete understanding of the present invention, and the advantages thereof, reference is now made to the following descriptions taken in conjunction with the accompanying drawings, in which:

FIG. 1b illustrates a cross-sectional view of the apparatus shown in FIG. 1a;

FIG. 2c illustrates a supplemental step in the heating of the sealing member of FIG. 2a;

FIG. 3a illustrates a perspective view of an optic fiber sleeve and sealing member in accordance with the present invention;

FIG. 3b illustrates a cross-sectional view of the invention shown in FIG. 3a;

FIG. 3c illustrates a perspective view of alternative sealing members in accordance with the present invention;

DETAILED DESCRIPTION OF THE INVENTION

Figure 1A:
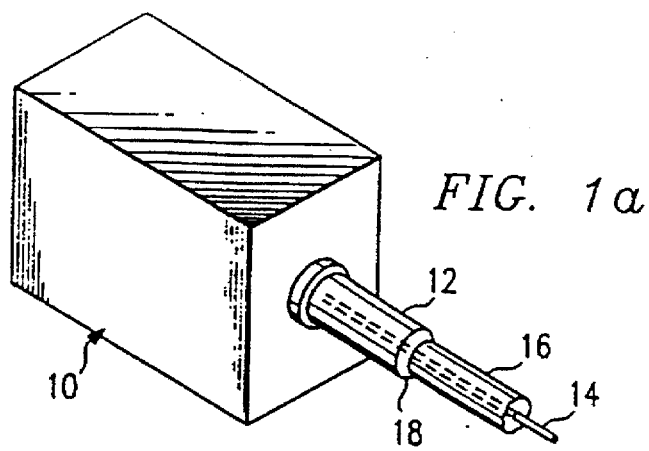
FIG. 1a illustrates the prior art of a typical fiber optic circuitry package having a ferrule and fiber optic sleeve passing through one side of the package.
Figure 1B:
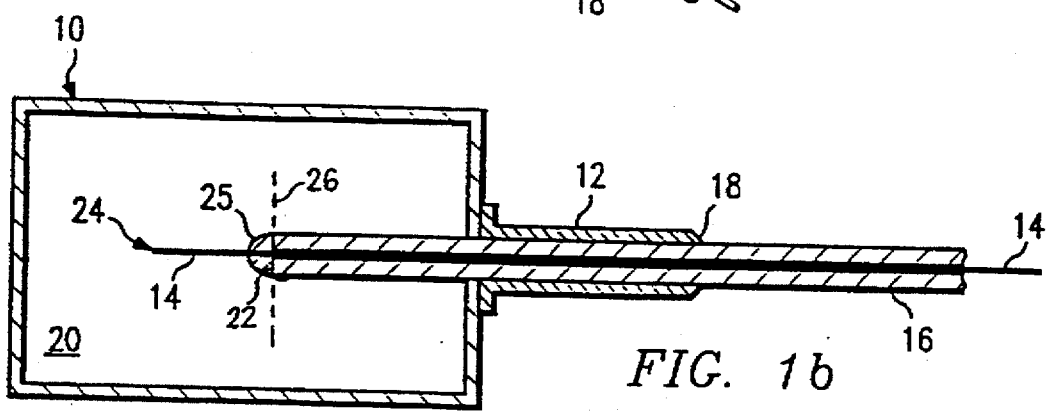
Figure 2A:
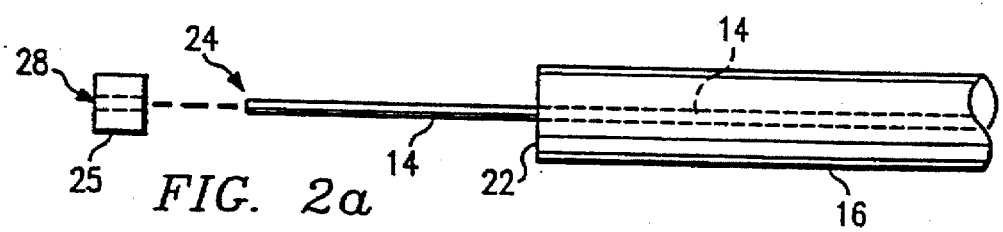
FIG. 2a illustrates a prior art method for attaching a cylindrical sealing member to a planar end of a sleeve.
Figure 2B:
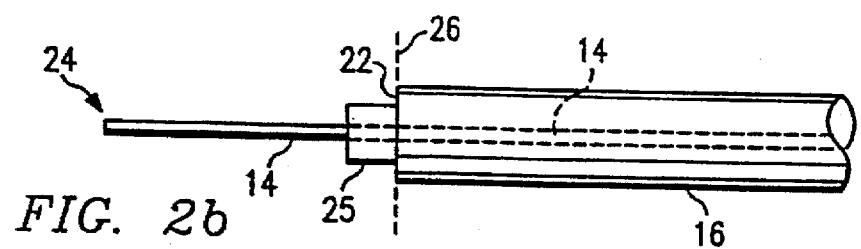
FIG. 2b illustrates a supplemental step in affixing the sealing member of FIG. 2a to its corresponding sleeve end.
Figure 2C:
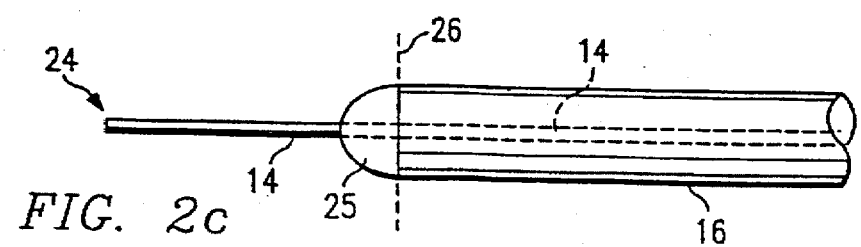

The preferred embodiment of the present invention and its advantages are best understood by referring to FIGS. 1–5b of the drawings, like numerals being used for like and corresponding parts of the various drawings.

FIG. 3a illustrates a perspective view of certain components implemented with the present invention. Specifically, FIG. 3a illustrates an improved optic fiber sleeve 30. In the preferred embodiment, sleeve 30 is generally cylindrical in shape and has an outer diameter on the order of 1700 microns. The preferred material used for constructing sleeve 30 is discussed in greater detail below. As in the prior art, sleeve 30 includes an axial channel 31 (shown in phantom) with a diameter on the order of 175 microns. An optic fiber 32 (shown as dotted line within sleeve 30), which typically has a diameter on the order of 125 microns is disposed through channel 31. In the preferred embodiment, optic fiber 32 is a non-metalized fiber.

In the preferred embodiment, an end 34 of sleeve 30 from which optic fiber 32 extends is constructed in a nonplanar fashion. In one embodiment, this nonplanar construction is accomplished by including a protrusion 36 at a surface end 37 of sleeve 30. Protrusion 36 is preferably integrally formed to sleeve 30, thereby creating a homogeneous structure. Protrusion 36 is preferably cylindrical in shape, but has a smaller diameter than the diameter of sleeve 30. This smaller diameter is on the order of 1000 microns.

FIG. 3a further illustrates a sealing member 38 used in conjunction with sleeve 30. In the preferred embodiment, sealing element 38 is generally cylindrical in shape and has a diameter on the order of 1500 microns and a length on the order of 1000 microns. The cylindrical shape of sealing element 38 includes an outer rim 40. As illustrated in greater detail below, rim 40 is shaped to physically align to the outer contour of surface end 37. Sealing element 38 further includes an internal void 42 (shown in phantom) which is formed in shape to match the inverse profile of protrusion 36. Thus, in the embodiment of FIG. 3a, since protrusion 36 is shaped as an extending cylinder, void 42 is correspondingly shaped as an inward void which is cylindrical in shape. Moreover, void 42 is dimensioned to fit snugly against surface 37 and protrusion 36. Finally, sealing element 38 includes an axial channel 44 (also shown in phantom) which passes through to the internal void 42. Axial channel 44 permits optic fiber 32 to be passed through the channel and, hence, is dimensioned to allow such passage. In the preferred embodiment, axial channel 44 is on the order of 150 microns in diameter. The preferred materials for constructing sealing element 38 are discussed in greater detail below.

FIG. 3b illustrates a cross-sectional view of the elements of FIG. 3a once optic fiber 32 has been threaded through sealing element 38. Moreover, in FIG. 3b, rim 40 of sealing element 38 is brought in contact with the outer perimeter of surface end 37. From this perspective, it may be appreciated that channel 31 of sleeve 30 generally aligns with channel 44 of sealing element 38. Thus, optic fiber 32 extends through sealing member 38. Further, an interface 46 is defined between flattened surface 40 of sealing element 38 and end surface 37 of sleeve 30 since optic fiber 32 has a smaller diameter than that of axial channel 31, a gap 35 is formed between optic fiber 32 and axial channel 31.

In FIG. 3b, internal void 40 (see FIG. 3a) of sealing element 38 physically aligns with the contour of protrusion 36. Thus, in addition to the contact along interface 46, an additional amount of surface area of contact occurs between sleeve 30 and sealing element 38. As described in greater detail below, once sealing member 38 is in the illustrated position, heat is applied to sleeve 30 so that sealing member 38 begins to soften and flow. Consequently, both pieces expand in response to the heat. Thereafter, both pieces are allowed to cool, thereby contracting and causing a compressive force between the two. The compressive force assures a greater adhesion between the pieces as compared to the prior art.

In addition, due to the preferred shape of sealing member 38 and protrusion 36, the contact between them is nonplanar in contrast to the prior art discussed above. This nonplanar configuration is highly advantageous because it substantially reduces the possibility that a crack may propagate all the way across the interface between the two components. Specifically, cracks have a tendency to travel along straight or relatively straight interfaces. The configuration of FIG. 3b, however, acts as a stop or barrier due to the 90° change in configuration created by protrusion 36. Consequently, any crack which might start along interface 46 is likely prohibited from reaching the interior of channels 31 or 44. Thus, the interior of these channels is effectively sealed from the exterior environment in furtherance of many of the objects of the present invention set forth above.

FIG. 3c illustrates a perspective view of a plurality of different shapes which may be implemented in constructing fiber optic sleeves in accordance with the present invention. Specifically, FIG. 3c illustrates seven various sleeves evenly numbered 46-58. The various embodiments of FIG. 3c illustrate that the respective ends from which a fiber protrudes may be shaped in various different configurations in accordance with the principles of the present invention. Moreover, as illustrated by sleeve 56, the nonplanar end of the sleeve may be configured such that it includes a void rather than a protrusion. For example, sleeve 56 is configured such that its end is concave and, therefore, an inward, rounded void is formed within the end of the sleeve. Moreover, for each sleeve in FIG. 3c, the corresponding sealing element is again configured to match the inverse profile of the end of the sleeve. For example, with reference to sleeve 46, its end is shaped to include a conical outward protrusion. Consequently, the corresponding sealing element for use with sleeve 46 is constructed to include an inward void which is also conical in shape.

FIG. 3c also illustrates various embodiments of sleeves which combine both a protrusion and a void in connection with the sleeve. Specifically, sleeves 52, 54 and 58 have ends which are trough-shaped, dimple-shaped and ridge-shaped, respectively. With reference to sleeve 52, the trough-shaped end is formed by an inwardly directed conical void which terminates into an outwardly directed conical protrusion. Consequently, the cross-section of this shape creates a trough-like shape at the end of sleeve 52. As another example, ridge-shaped sleeve 58 includes an outward conical protrusion which starts from just inside the outer perimeter of sleeve 58 for a predetermined distance, and then becomes an inward conical void for a second predetermined distance toward the axis of the sleeve. In each of the sleeves illustrated in FIG. 3c, the unique configuration of the sleeve end creates an increased amount of surface contact and a nonplanar interface with its corresponding sealing member. Thus, the benefits described above in connection with FIG. 3b are also realized with the embodiments shown in FIG. 3c.

As stated above, in the preferred embodiment, the sealing member used with a particular sleeve is constructed and dimensioned as the inverse profile of the shape of the corresponding sleeve end. Note, however, that in an alternative embodiment, the sealing member may simply be a mass of a second material with no particular shape, but which includes a channel so that the optic fiber may be threaded through the channel as shown in FIG. 3b. In this instance, the mass is again placed in contact with the sleeve end and heated as discussed above. The lack of a preferred shape, however, will require a greater intensity and/or longer period of heat than that necessary to soften a sealing member having an inversely shaped profile as discussed above. This increased heat should be carefully controlled to ensure that the materials used in constructing the sealing member and/or sleeve do not boil under the increased heat. Boiling is undesirable because bubbles may occur and air may be trapped in the final product, thereby reducing the integrity of the seal.

Figure 4:
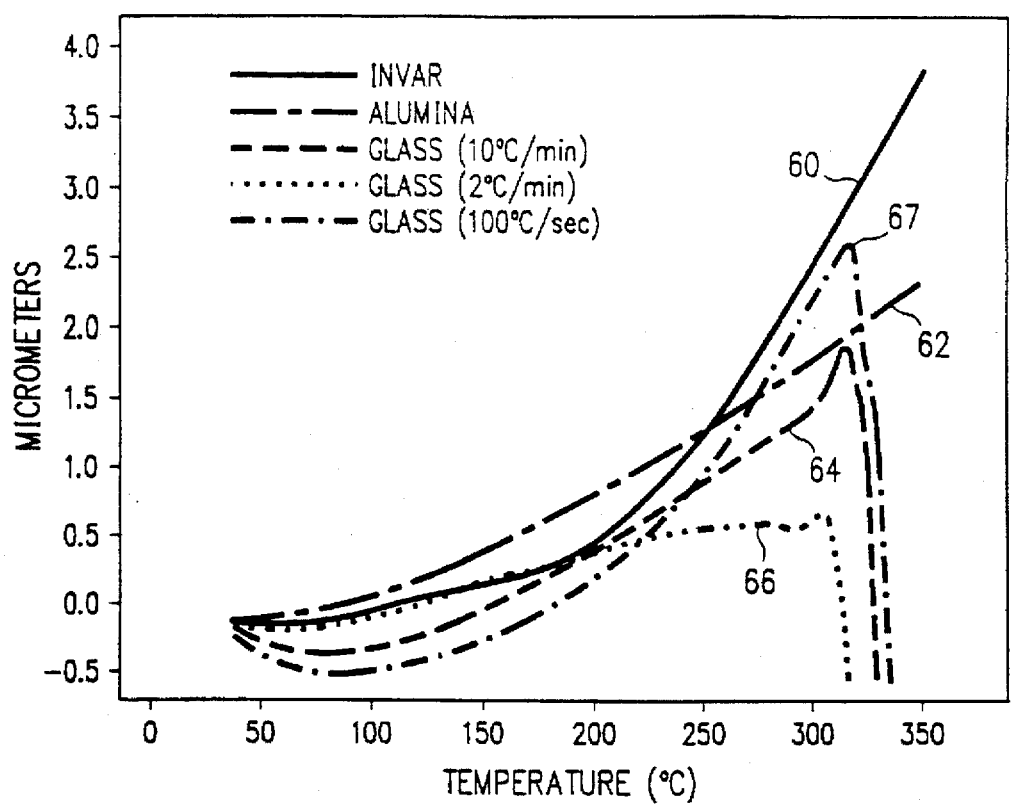
FIG. 4 illustrates a plot of the coefficient of thermal expansion for respective preferable materials used with the present invention.

FIG. 4 illustrates a graph to demonstrate a particular characteristic used in the present invention to select the preferable materials for constructing the components illustrated in FIGS. 3a–c, above. Specifically, FIG. 4 illustrates the coefficient of thermal expansion (CTE) for various different materials. The CTE of a particular material is defined as the percentage increase in length of the material over a given change in temperature, or its decrease in percentage size over a corresponding decrease in temperature. Thus, the graph of FIG. 4 has temperature in degrees centigrade as its horizontal axis and micrometers as its vertical axis. Note also that a CTE may be stated for a specific material at a specific temperature. Thus, for purposes of this document, the CTE may be defined either according to whether it is specified in terms of a range, or a rate of change at a specific temperature.

The graph of FIG. 4 includes five separate plots 60, 62, 64, 66 and 67. Plots 60 and 62 indicate the rate of change in size for a given amount of invar and alumina, over the illustrated temperature, respectively. Thus, as appreciated from FIG. 4, these two different substances have varying rates of expansion and contraction depending upon the particular temperature to which they are exposed.

Plots 64, 66 and 67 all illustrate the thermal expansion/contraction of low temperature glass (i.e., glass having a melting point between 305°–450° C.). The difference between these three plots, however, depends upon the specific rate at which the glass is heated. Particularly, plot 64 illustrates the characteristic expansion/contraction of glass when heated at 10° C./minute. Comparatively, plot 66 illustrates the expansion/contraction characteristic for glass when heated at a rate of 2° C./minute. Finally, plot 67 illustrates the expansion/contraction of glass when heated at 100° C./second. Thus, a comparison of plots 64, 66 and 67 illustrates that the greater the rate of applied heat, the larger the change in expansion/contraction for a glass substance. Note also that the additional increase of heat application to glass on the order of 100° C./second draws plot 67 for the glass characteristic to a level between that of plot 60 corresponding to invar and plot 62 corresponding to alumina.

From FIG. 4, it should be appreciated that the various substances have varying expansion/contraction characteristics. Further, note that the CTEs for all the materials plotted in FIG. 4 are relatively similar from temperatures between 50° C. and 150° C., while they diverge from one another above 225° C. This characteristic is used in the present invention to select the materials for constructing various sealing members and sleeves. Specifically, and as discussed in greater detail below, materials for constructing component parts are selected so that their respective CTEs are widely different for temperatures at which the parts are assembled to one another (i.e., temperatures above 225° C.) but similar for temperatures at which the assembled parts are operated (i.e., temperatures below 150° C.).

Figure 5A:
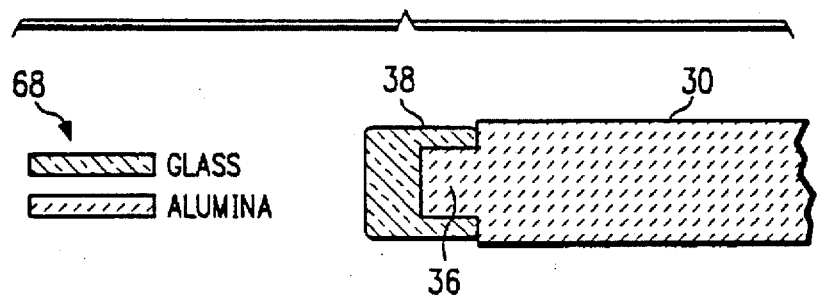
FIG. 5a illustrates a simplified view of the illustration of FIG. 3a, with a legend demonstrating the preferred materials in one embodiment of the present invention.

FIG. 5a illustrates a simplified side view of the components illustrated in FIG. 3b. For purposes of simplicity of illustration, however, fiber optic 32 as well as channels 31 and 44 have been removed from the drawing. Thus, FIG. 5a illustrates only the combination of sealing element 38 when placed in contact with protrusion 36 and surface 37 of sleeve 30.

FIG. 5a further illustrates a legend 68 which depicts the preferable materials used to construct the embodiment of the structure of FIG. 5a. Thus, sealing element 38 in FIG. 5a is constructed of glass while sleeve 30 is constructed of alumina. From the concepts discussed above in connection with FIG. 4, recall that glass, when heated at the desirable rate discussed above (i.e., 100° C./second), contracts at a rate faster than alumina. Consequently, in constructing the structure of FIG. 5a, once sealing element 38 is brought in contact with sleeve 30, sealing element 38 is heated at a rate of 100° C./second until it reaches an assembly temperature where the CTE of glass begins to increasingly differ from that of alumina. From FIG. 4, it may be appreciated that such a temperature is on the order of 300° C. At this temperature, the glass sealing element flows and fuses to the alumina sleeve. Thereafter, the entire structure is permitted to cool to its normal operating temperature (e.g., 75° C. to 100° C). Because the glass sealing element contracts at a rate faster than the alumina sleeve, a compressive force occurs at the void within sealing element 38, and effectively clamps or compresses protrusion 36. Thus, an increased bond is formed between sealing element 38 and sleeve 30. Moreover, the high level of heat applied to sealing element 38 causes it to soften and fill in any interstitial pores which exist in the alumina material of sleeve 30. Thus, bonding is also improved at an interstitial level as well.

Figure 5B:
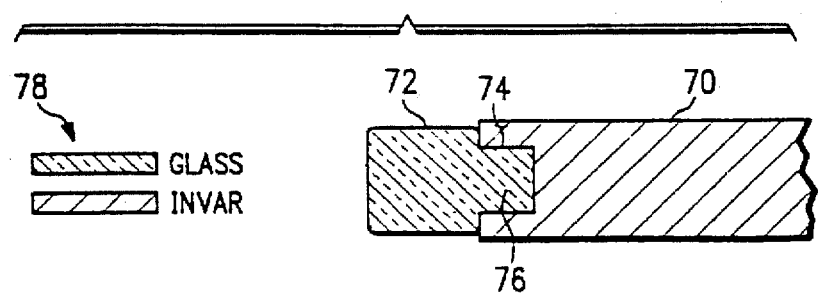
FIG. 5b illustrates a simplified view of the illustration of FIG. 3a, with a legend demonstrating the preferred materials in another embodiment of the present invention.

FIG. 5b illustrates an alternative physical configuration and choice of materials for the embodiment illustrated in FIG. 5a, above. Specifically, FIG. 5b illustrates a similar side view of a sleeve 70 in contact with a sealing element 72. In FIG. 5b, however, sleeve 70 is configured to have a void 74 which is generally cylindrical in shape and has a diameter less than the diameter of sleeve 70. Again, sealing element 72 is constructed to have an inverse profile from the end of sleeve 74 and, therefore, includes a protrusion 76 for physically aligning with the contour of void 74.

A second significant difference between the structure of FIG. 5b from that of FIG. 5a is the change in material for sleeve 70. As illustrated by legend 78, sleeve 70 is constructed of invar while sealing element 72 remains constructed of glass. From a review of FIG. 4 above, however, note that invar expands/contracts at a rate greater than that of glass when heated at the desirable rate and to the desirable temperature set forth above. These relative contraction rates of the two materials facilitates an improved bond between sealing element 72 and sleeve 70. Specifically, after heat is applied to assemble the structure of FIG. 5b and as it is permitted to cool to an operating temperature, the invar sleeve contracts at a rate greater than the glass sealing element 72. Thus, the structure of sleeve 70 around the periphery of void 74 tends to squeeze protrusion 76, thereby improving the compressive force between the two pieces as discussed above in connection with FIG. 5a. Moreover, again there is additional bonding to the extent that the glass attaches with the pores of the invar sleeve.

From the above, it may be appreciated that the concepts illustrated in FIGS. 3a–5b permit a person having ordinary skill in the art to construct an improved seal and sleeve combination by choosing particular materials and device configurations. As yet another example, the structure of FIG. 5a could be used wherein sealing element 38 was constructed of invar while sleeve 30 was constructed of glass. Again, this combination of materials along with the physical configuration shown would cause the faster contracting material of invar to apply a compressive force to the slower contracting glass protrusion 36. Moreover, while the combinations of invar and glass or alumina and glass represent the preferred materials used in the present invention, it should be appreciated that the present invention is not intended to be limited thereto. Still other materials could be selected according to their desirable rates of contraction, and the intended operational temperature for the constructed device. Finally, while the present invention is described in connection with fiber optic technology and a fiber optic sleeve, the particular use of many of the principles herein need not necessarily be limited thereto. Thus, other types of applications benefitting from enhanced compressive force could use the principle of combining a nonplanar configuration with materials with appropriate CTEs without departing from the spirit of the present invention. Consequently, while the present invention has been described in detail, various substitutions, modifications or alterations could be made to the descriptions set forth above without departing from the invention which is defined by the following claims.

What is claimed is:

1. A hermetically sealed fiber optic assembly, comprising:
   a sleeve having an axial channel and a nonplanar sleeve end;
   a fiber extending through said axial channel and having a distal fiber tip extending outward from said nonplanar sleeve end wherein a gap is formed between said fiber and said axial channel; and
   a hermetic sealing member hermetically affixed adjacent and in physical contact with said nonplanar sleeve end;
   wherein said fiber extends through said hermetic sealing member;
   wherein a nonplanar interface is formed between said nonplanar sleeve end and said hermetic sealing member;
   wherein said hermetic sealing member hermetically seals said gap proximate said sleeve end.

2. The sealed fiber optic assembly of claim 1 wherein said sleeve comprises a cylinder having a first diameter, and wherein said nonplanar sleeve end comprises a cylinder having a second diameter smaller than said first diameter.

3. The sealed fiber optic assembly of claim 1 wherein said nonplanar sleeve end comprises a first material having a first coefficient of thermal expansion, and wherein said hermetic sealing member comprises a second material having a second coefficient of thermal expansion, wherein a compressive force is generated between said first and second materials due to the differences in said first and second coefficients of thermal expansion, said compressive force forming a seal between said first and second materials.

4. The hermetically sealed fiber optic assembly of claim 1 wherein said hermetic sealing member is affixed by:
   heating said hermetic sealing member to a first temperature sufficient to cause said hermetic sealing member to flow adjacent said nonplanar end of said sleeve; and
   cooling said hermetic sealing member to a second temperature less than said first temperature, wherein said nonplanar interface is formed between said sleeve end and said hermetic sealing member and wherein said hermetic sealing member hermetically seals said gap proximate said sleeve end.

5. A fiber optic assembly, comprising:
   a sleeve comprising an axial channel and a nonplanar end;
   a fiber extending through said axial channel of said sleeve, wherein said fiber has a tip extending outward from said nonplanar end of said sleeve and wherein a gap is formed between said fiber and said axial channel proximate said sleeve end;
   a sealing member adjacent said nonplanar end of said sleeve wherein said fiber tip extends outward from said sealing member;
   wherein said sealing member is bonded to said nonplanar end of said sleeve and to said fiber by the step of:
      disposing the sealing member adjacent said nonplanar end to fully mate with and is in abutment with said nonplanar end of said sleeve wherein said fiber extends through said hermetic sealing member, wherein said sealing member is preformed to comprise a preformed end having a shape which is an entire inverse profile of said nonplanar end.

6. The fiber optic assembly of claim 5 wherein said sealing member is bonded to said nonplanar end of said sleeve and to said fiber by the further steps of:
   heating said hermetic sealing member to a first temperature sufficient to cause said hermetic sealing member to flow adjacent said nonplanar end of said sleeve; and
   cooling said hermetic sealing member to a second temperature less than said first temperature, wherein a nonplanar interface is formed between said sleeve end and said hermetic sealing member and wherein said hermetic sealing member hermetically seals said gap proximate said sleeve end.

7. The fiber optic assembly of claim 5 wherein said sleeve comprises a cylindrical having a first diameter, and wherein said nonplanar end comprises a cylinder having a second diameter smaller than said first diameter.

8. The fiber optic assembly of claim 5 wherein said sleeve comprises a cylinder having a first diameter, and wherein said nonplanar end comprises an inward void comprising a cylindrical void having a second diameter less than said first diameter.

9. A fiber optic assembly, comprising:
   a sleeve comprising a nonplanar end, said nonplanar end comprising a first material comprising alumina and having a first coefficient of thermal expansion;
   a fiber extending through said sleeve, wherein said fiber has a tip extending outward from said nonplanar end of said sleeve;
   a sealing member adjacent said nonplanar end of said sleeve wherein said fiber tip extends outward from said sealing member, wherein said sealing member comprises a second material comprising glass and having a second coefficient of thermal expansion;
   wherein said sealing member is bonded to said nonplanar sleeve end and to said fiber by the steps of:
      heating said sealing member to a first temperature sufficient to cause said second material to flow adjacent said nonplanar end of said sleeve; and
      cooling said sealing member to a second temperature less than said first temperature, wherein a compressive force is generated between said first and second materials due to the differences in said first and second coefficients of thermal expansion, said compressive force forming a seal between said first and second materials and a bond between said sealing member, said fiber, and said nonplanar sleeve end.

10. A fiber optic assembly, comprising:
    a sleeve comprising a nonplanar end, said nonplanar end comprising a first material comprising nickel and iron and having a first coefficient of thermal expansion;
    a fiber extending through said sleeve, wherein said fiber has a tip extending outward from said nonplanar end of said sleeve;
    a sealing member adjacent said nonplanar end of said sleeve, wherein said sealing member comprises a second material comprising glass and having a second coefficient of thermal expansion;
    wherein said sealing member is bonded to said nonplanar sleeve end and to said fiber by the steps of:
       heating said sealing member to a first temperature sufficient to cause said second material to flow adjacent said nonplanar end of said sleeve; and
       cooling said sealing member to a second temperature less than said first temperature, wherein a compressive force is generated between said first and second materials due to the differences in said first and second coefficients of thermal expansion, said compressive force forming a seal between said first and second materials and a bond between said sealing member, said fiber, and said nonplanar sleeve end.

11. A fiber optic assembly, comprising:
    a sleeve comprising a nonplanar end, said nonplanar end comprising a first material having a first coefficient of thermal expansion;
    a fiber extending through said sleeve, wherein said fiber has a tip extending outward from said nonplanar end of said sleeve;
    a sealing member adjacent said nonplanar end of said sleeve, wherein said sealing member comprises a second material having a second coefficient of thermal expansion;
    wherein said sealing member is bonded to said nonplanar sleeve end and to said fiber by the steps of:
       heating said sealing member to a first temperature sufficient to cause said second material to flow adjacent said nonplanar end of said nonplanar sleeve end; and
       cooling said sealing member to a second temperature less than said first temperature, wherein a compressive force is generated between said first and second materials due to the differences in said first and second coefficients of thermal expansion, said compressive force forming a seal between said first and second materials.

12. The fiber optic assembly of claim 11 wherein said nonplanar end of said sleeve comprises an outward protrusion from said sleeve and wherein said second material contracts at a faster rate than said first material during said cooling step and a bond between said sealing member, said fiber, and said nonplanar sleeve end.

* * * * *